May 3, 1938.  E. J. HOUDRY ET AL  2,115,714
HEAT EXCHANGE APPARATUS
Filed Feb. 26, 1935   3 Sheets-Sheet 1
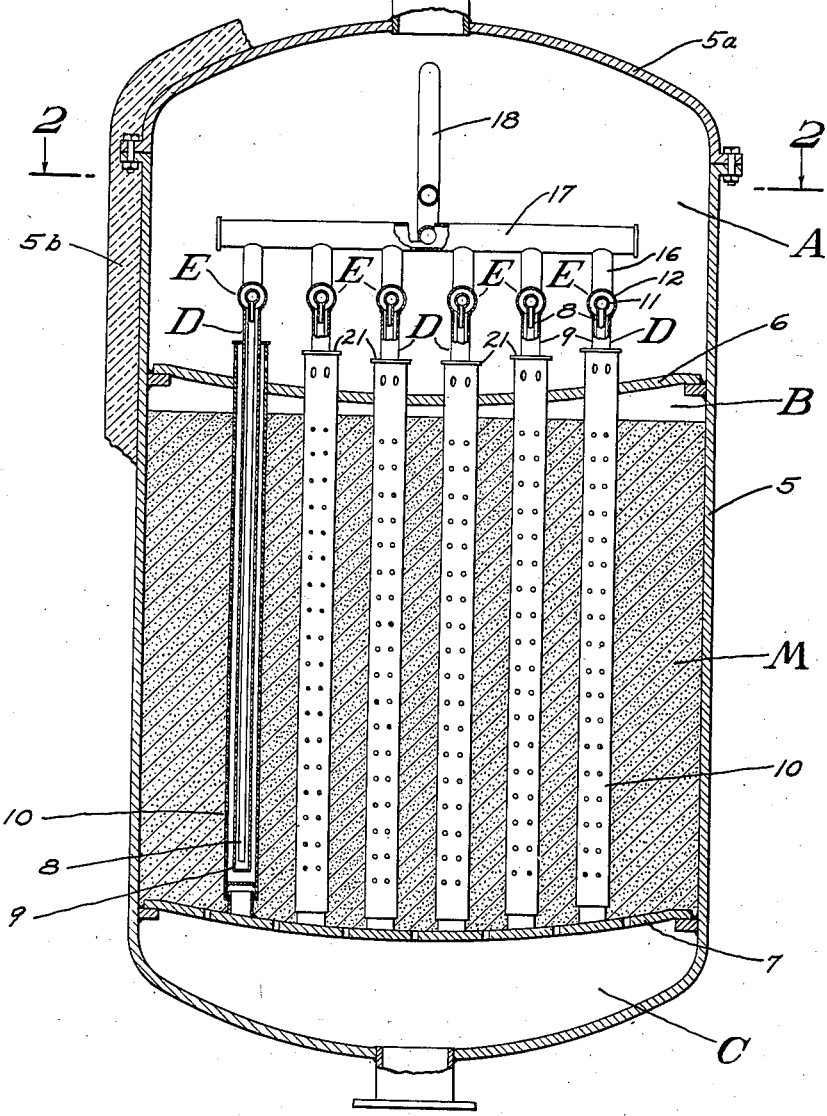
INVENTORS
Eugene J. Houdry
Thomas B. Prickett
BY
Ira L. Nickerson
ATTORNEY.

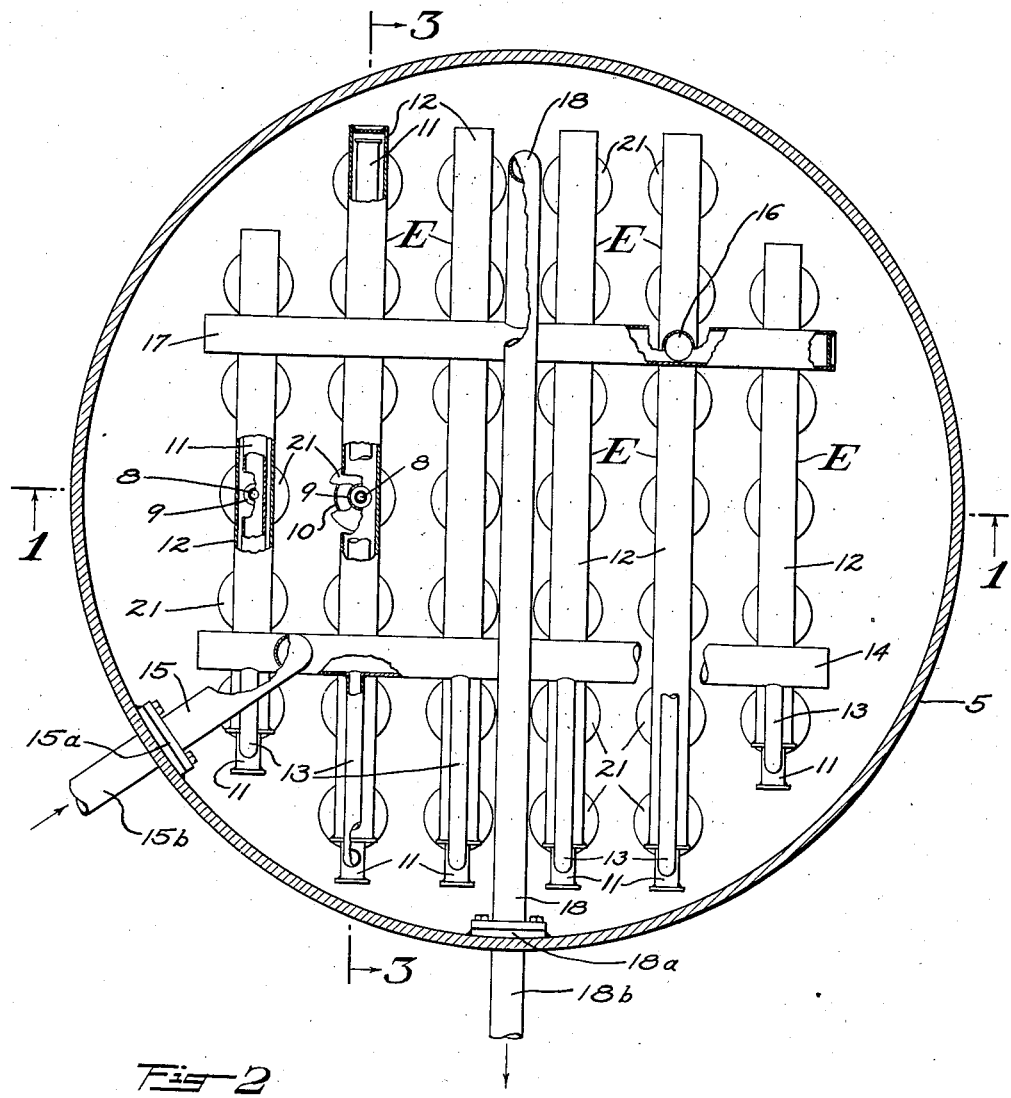

May 3, 1938.  E. J. HOUDRY ET AL  2,115,714
HEAT EXCHANGE APPARATUS
Filed Feb. 26, 1935   3 Sheets-Sheet 3
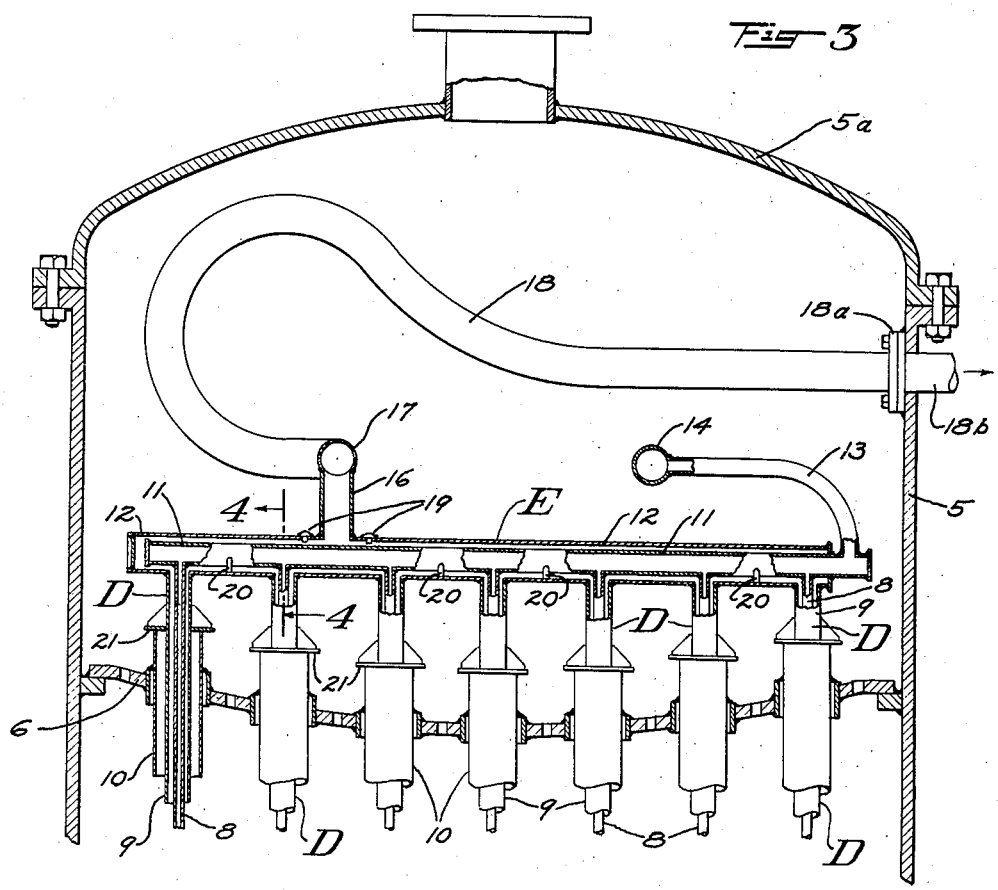
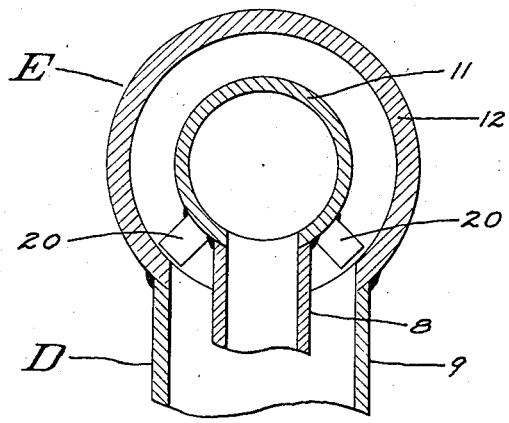
INVENTORS
Eugene J. Houdry
Thomas B. Prickett
BY
Ira L. Nickerson
ATTORNEY.

Patented May 3, 1938

2,115,714

UNITED STATES PATENT OFFICE 2,115,714

HEAT EXCHANGE APPARATUS

Eugène J. Houdry, Philadelphia, Pa., and Thomas B. Prickett, Woodbury, N. J., assignors to Houdry Process Corporation, Dover, Del., a corporation of Delaware Application February 26, 1935, Serial No. 8,262

11 Claims. (Cl. 23—288)

This invention relates to heat exchange systems for a circulated fluid medium and to manifolds therefor. More particularly, it concerns heat exchange systems for converters for effecting chemical reactions, both exothermic and endothermic, especially when the reactions occur with or in the presence of catalytic or other contact masses.

One object of the invention is to devise compact and efficient apparatus for a heat exchange system which provides for relative movement of parts and reverse movement of fluid. Another object is suitably to mount the heat exchange apparatus within a converter. Another object is to provide a novel supporting arrangement for fluid conduits which latter extend from a manifold into a reaction chamber. Still another object is to design a manifold capable of use as a unit in the assembly of large converters. Still other objects will be apparent from the detailed description which follows.

In order to illustrate the invention, one concrete embodiment with minor modifications is shown in the accompanying drawings, in which:

Fig. 1 is a vertical sectional view through a converter substantially on the line 1—1 of Fig. 2, showing some of the parts in elevation;

Fig. 2 is a transverse sectional view on an enlarged scale substantially on the line 2—2 of Fig. 1, showing the manifold unit in plan with certain details in section;

Fig. 3 is a vertical sectional view of the upper portion of the converter substantially on the line 3—3 of Fig. 2, showing additional details of the heat exchange system and a modified form of the upper tube sheet; and Fig. 4 is a detail sectional view on a greatly enlarged scale substantially on the line 4—4 of Fig. 3.

The converter comprises a casing 5 having a detachable cover 5a and the entire exterior lagged with heat insulating material 5b. Within are suitably supported perforated partitions or flue or tube sheets 6 and 7 dividing the interior into an upper manifolding chamber A, an intermediate or central reaction chamber B, and a lower manifolding chamber C. Reaction chamber B is substantially filled with a catalytic or other contact mass M capable of effecting, promoting or assisting the desired reaction. The reactant fluids may be sent into the converter from either end, and the reaction products removed from the opposite end.

A heat exchange system is provided for controlling the reaction by imparting heat to or removing heat from contact mass M as may be desired or required. The system sends the heat exchange fluid, preferably in the form of a liquid such as water, mercury, diphenyl, or the like and under pressure, in and through the mass in a plurality of parallel streams and in a reverse flow arrangement; i. e. one stream flowing in the reverse direction to another adjacent or surrounding stream thereof. To this end, a series of elements D each comprising inner supply tubes 8 and outer tubes 9 in nested telescoped relation extend through perforations in upper partition 6 into contact with mass M to substantially the full depth thereof. By preference, outer tubes 9 are kept out of direct contact with mass M by an enclosing member 10 which may be either perforate or imperforate, as will be later explained. In a uniform arrangement of heat exchange elements D in a converter such as 5, there will be a number of such elements in line and a series of such lines. The elements in each line are preferably connected to the same manifold E as indicated in Fig. 3, and a plurality of such aligned series of elements and manifolds therefor are indicated in Figs. 1 and 2. Each manifold E comprises an inner supply conduit 11 which has connections to each of the inner tubes 8 of elements D in a given series and an outer conduit 12 in spaced enclosing telescoping relation with conduit 11 and into which outer tubes 9 of elements D discharge. As indicated in Figs. 2 and 3, inner conduit 11 of each manifold E projects beyond the outer conduit 12 and has a bent connection 13 leading to a supply main 14 extending above and transversely to manifolds E. A connection 15 leads from main 14 to the converter casing to make a fluid-tight joint at 15a with a supply conduit 15b extending through the converter wall. Each of the outer conduits 12 of manifolds E has a short connection 16 leading to outlet main 17 disposed above and transversely to manifolds E and in parallel with supply main 14. A long looped connection 18 extends from main 17 to make a fluid-tight joint at 18a with an outlet conduit 18b which projects through the converter wall.

Inasmuch as there will be wide temperature changes in the heat exchange system, especially when it is utilized to control strongly exothermic or strongly endothermic reactions, adequate provision must be made for relative movement of parts. In the case of the nested tubes 8 and 9 making up the elements D which extend into reaction chamber B, inner tube 8 is mounted centrally of outer tube 9, and there is sufficient clearance between these tubes for their own movement and for variations in the relative lengths of inner and outer conduits 11 and 12, respectively, of manifolds E. To guide the movement of the last named conduits and to prevent binding or other mutual interference tending to distort or rupture the same or the nested tubes 8 and 9 making up elements D, guide members or projections 19 (Fig. 3) may be mounted in or on outer conduits 12 for sliding contact with inner conduits 11. In addition, inner conduits 11 have guide members 20 (Figs. 3 and 4) which together with members 19 effect three-point contacts at suitably spaced intervals throughout the length of manifolds E. Elements D may extend within enclosing members 10, with ample clearance, as clearly indicated in Figs. 1 and 3. To define and limit the extent of projection of elements D within enclosing members 10 and within reaction chamber B outer tubes 9 of elements D have fixed stop members 21 thereon which rest loosely upon a plurality of suitably disposed bearing or supporting surfaces, such as the tops of members 19 which latter may, in turn, be joined to supporting structure such as partition member 6 (shown in Fig. 3). Stop members 21 may serve as closures or caps for the latter and be arranged for transverse sliding movement thereon. Hence the manifold unit, which comprises manifolds E and mains 14 and 17, is supported in place partly by the supply and outlet connections 15 and 18 through their attachment to the converter wall and by the stops or caps 21.

By removing cover 5a of the converter, and by breaking joints 15a and 18a, the entire heat exchange system can be lifted out of the converter as an entirety, or it may be partly disassembled by first detaching the transverse supply and outlet mains 14 and 17 whereupon manifolds E with their associated elements D can be withdrawn individually. In the event of use of a converter which is much larger than that disclosed in the accompanying drawings, a number of the manifolding units comprising parallel manifolds E and transverse mains 14 and 17 would be provided, inasmuch as there are limits to the permissible relative movement of conduits 11 and 12 making up manifold E when connected, in the manner illustrated, to a number of the nested tubular elements D.

Movement of reactant fluids and reaction products to, within and from the converter may be arranged as desired. If enclosing members 10 for heat exchange elements D are imperforate, as indicated in Fig. 3, the reactants could be passed through the reaction chamber from end to end by providing small perforations in upper tube sheet 6, as shown in Fig. 3 and by similar perforations in tube sheet 7, as shown in Fig. 1. By providing members 10 with perforations throughout those portions which are in reaction chamber B, as illustrated in Fig. 1, and with larger perforations above tube sheet 6, these members can be used to distribute reactant fluids all through the mass, if the fluids are admitted to manifolding chamber A, or to withdraw the reaction products from a multiplicity of points within the mass if the reactant fluids are admitted to manifolding chamber C. In this instance, the heat exchange fluid could be utilized to supply heat to the reactants for an endothermic reaction by sending the same into manifolding chamber A, and, conversely, it could be utilized to remove some or all of the undesirable or excess heat of an exothermic reaction by passing the reactants into manifolding chamber C and causing the hot reaction products to enter the perforations of members 10 and pass along or over heat exchange elements D enclosed therein. Inasmuch as the present invention may be considered in certain respects as an improvement upon or further development of the invention disclosed in the copending application of E. J. Houdry and R. C. Lassiat, Serial No. 728,544 filed June 1, 1934, which issued as Patent No. 2,078,947 on May 4, 1937, it is apparent that there may be mounted in reaction chamber B one series of perforated conduits additional to conduits 10 and even more than one such series when conduits 10 are imperforate as in Fig. 3.

It is to be noted that the present invention involves supporting the manifold unit on or within the converter in such a way that there is but a single rigid or substantially rigid connection between them. In the illustrated form of the invention this rigid connection is supply conduit 15 (Fig. 2) which fixes the position of supply main 14 in relation to the converter wall. All other parts of the manifold unit are capable of movement relative to each other and to the fixed point or junction of conduit 15 with main 14 so as to avoid rupture of connections or other injury, particularly those movements induced by relative temperature variations, as for example when main 14 and tube sheet 6 pass from a phase in which they are at substantially the same temperature to a phase in which they are at widely different temperatures.

We claim as our invention:

1. In a converter for treating fluids having an upright casing providing adjacent manifolding and reaction chambers, the manifolding chamber being adjacent an end of said reaction chamber, the combination therewith of apparatus adapted to effect heat interchange within said reaction chamber which comprises at least one manifold, adapted to conduct heat exchange medium and made up of nested inlet and outlet conduits, located within said manifolding chamber, nested spur tubes connected to and extending at least approximately vertically from said manifold at intervals into said reaction chamber, thereby to provide for circulating heat exchange fluid in confined streams within said reaction chamber, said spur tubes being rigidly fastened only to said manifold, supporting structure located within said casing adjacent said manifold and providing a plurality of supporting surfaces horizontally spaced from each other throughout the transverse dimensions of said casing, and said heat exchange apparatus, comprising said manifold and said spur tubes, being freely supported on said supporting surfaces so as to permit limited relative horizontal movement of said heat exchange apparatus with respect to other portions of the converter, thereby to avoid stresses due to unequal thermal expansions and contractions.

2. In a converter for treating fluids having an upright casing providing adjacent manifolding and reaction chambers, the manifolding chamber being adjacent the upper end of said reaction chamber, the combination therewith of apparatus adapted to effect heat interchange within said reaction chamber which comprises at least one manifold, adapted to conduct heat exchange medium and made up of nested inlet and outlet conduits, located within said manifolding chamber, nested spur tubes connected to and extending at least approximately vertically from said manifold at intervals into said reaction chamber, thereby to provide for circulating heat exchange fluid in confined streams within said reaction chamber, said spur tubes being rigidly fastened only to said manifold, a partition member, having openings therethrough to permit the passage of fluids and to allow said spur tube to pass therethrough, extending approximately horizontally across said converter between said reaction chamber and said manifold, the openings in said partition member through which said spur tubes extend being substantially larger than said tubes, said beam-like member providing a plurality of supporting surfaces horizontally spaced from each other throughout the transverse dimensions of said casing, and said heat exchange apparatus, comprising said manifold and said spur tubes, being freely supported on said supporting surfaces so as to permit limited relative horizontal movement of said heat exchange apparatus with respect to other portions of the converter, thereby to avoid stresses due to unequal thermal expansions and contractions.

3. In a converter providing a reaction chamber for containing a contact mass, conduits open at one end extending into said reaction chamber, means extending through the open ends of said conduits and loosely fitting therewithin for passing a heat exchange medium therewithin to absorb heat from or impart heat to said conduits, a manifolding unit connected to said means, and closures freely fitting against the open ends of said conduits and through which said means extend, permitting transverse movement of said means with relation to said conduits.

4. In a converter providing a reaction chamber for containing a contact mass, conduits having open ends extending into said reaction chamber, means extending through the open ends of said conduits and within the latter for circulating a fluid within said conduits to absorb heat from or impart heat to the latter, and stops on said means in the form of freely-fitting caps or closures for said conduits slidable transversely of the latter and serving to limit the projection of said means therewithin.

5. In a converter providing a reaction chamber, a manifolding chamber adjacent one end of said reaction chamber, a tube sheet separating said reaction chamber from said manifolding chamber, and a plurality of tubular members arranged within said reaction chamber and communicating with said manifolding chamber through said tube sheet, the combination therewith of apparatus adapted to effect heat interchange within said reaction chamber which comprises at least one manifold, adapted to conduct heat exchange medium and made up of nested telescoping inlet and outlet conduits, located within said manifolding chamber, said manifold being supported in freely slidable relation to permit relative transverse movement thereof with respect to said tube sheet and tubular elements, thereby to avoid stresses due to dissimilar expansion and contraction of parts in a similar transverse plane caused by uneven temperature changes in different parts of the converter.

6. In a converter providing a reaction chamber, a manifolding chamber adjacent one end of said reaction chamber, a tube sheet separating said reaction chamber from said manifolding chamber, and a plurality of tubular members arranged within said reaction chamber and communicating with said manifolding chamber through said tube sheet, the combination therewith of apparatus adapted to effect heat interchange within said reaction chamber which comprises at least one manifold, adapted to conduct heat exchange medium and made up of nested telescoping inlet and outlet conduits, located within said manifolding chamber, nested spur tubes extending from said manifold at intervals and within said tubular members within said reaction chamber, each having passages communicating with the inner and outer conduits of said manifold, respectively, said manifold being freely supported to permit relative transverse movement with respect to said tube sheet and tubular elements, thereby to avoid stresses due to temperature changes in different parts of the converter.

7. In a converter providing a reaction chamber, a manifolding chamber adjacent one end of said reaction chamber, a tube sheet separating said reaction chamber from said manifolding chamber, and a plurality of tubular members arranged within said reaction chamber and communicating with said manifolding chamber through said tube sheet, the combination therewith of apparatus adapted to effect heat interchange within said reaction chamber which comprises at least one manifold, adapted to conduct heat exchange medium and made up of nested telescoping inlet and outlet conduits, located within said manifolding chamber, nested spur tubes connected to and extending from said manifold at intervals and within said tubular members within said reaction chamber, each having passages communicating with the inner and outer conduits of said manifold, respectively, and having stop members limiting the projection thereof within said tubular member and freely supporting at least a substantial part of the weight of said manifold on surfaces adjacent the openings in the tops of said tubular members, to permit transverse movement of the heat exchange apparatus relative to said tubular members.

8. In a converter providing a reaction chamber, a second chamber for reactants or reaction products adjacent one end of said reaction chamber, and a partition separating said chambers, the combination therewith of apparatus adapted to effect heat interchange within said reaction chamber which comprises a manifold unit consisting of a series of manifolds, spaced one from another, adapted to conduct a heat exchange medium and each made up of nested telescoping inlet and outlet conduits located within said second chamber, a plurality of nested tubular members arranged within said reaction chamber and communicating with said manifolds through said partition, inlet and outlet headers connecting said manifolds and communicating with the inlet and outlet conduits thereof respectively, one only of said headers being substantially rigidly connected to the converter, said unit being freely supported at a plurality of points throughout the area of said partition to permit relative transverse movement of said manifolding unit with respect to said partition, thereby to avoid stresses due to temperature changes in different parts of the converter.

9. A converter having an open end, a removable cover therefor, a tube sheet forming a partition and dividing the interior of the converter into a manifolding chamber and a reaction chamber, perforated conduits mounted in said tube sheet and extending into said reaction chamber and adapted to provide fluid communication between said manifolding chamber and various points throughout said reaction chamber, and a heat exchange system insertable and removable through said open end and comprising nested spur tubes extending into said conduits and below said tube sheet, and a manifold unit above the latter and connected to said spur tubes and fully contained in said manifolding chamber, and means providing cooperation between said conduits and said system so that the former will at least partly support the latter to permit free relative horizontal movement therebetween.

10. A converter having an open end, a removable cover therefor, a tube sheet forming a partition and dividing the interior of the converter into a manifolding chamber and a reaction chamber, conduits mounted in said tube sheet and extending into said reaction chamber, and a heat exchange system insertable and removable through said open end and comprising elements extending into said conduits and below said tube sheet, and a manifold unit above the latter and fully contained in said manifolding chamber, said elements having stop members freely engaging the tops of said conduits to limit the projection of said elements therewithin and to support at least a part of the weight of said system but to permit transverse movement of said elements relative to respective conduits.

11. A converter having an open end, a removable cover therefor, a tube sheet forming a partition and dividing the interior of the converter into a manifolding chamber and a reaction chamber, conduits mounted in said tube sheet and extending into said reaction chamber, and a heat exchange system insertable and removable through said open end and comprising elements extending into said conduits and below said tube sheet, and a manifold unit above the latter and fully contained in said manifolding chamber, said elements having stop members engaging the tops of said conduits to limit the projection of said elements therewithin and to support at least a part of the weight of said system, said stop members serving as closures for said conduits and slidable thereon when there is transverse movement of parts due to variations in temperature.

EUGÈNE J. HOUDRY.
THOMAS B. PRICKETT.

CERTIFICATE OF CORRECTION.

Patent No. 2,115,714.                                May 3, 1938.
                     EUGÈNE J. HOUDRY, ET AL.

It is hereby certified that error appears in the printed specification of the above numbered patent requiring correction as follows: Page 3, first column, line 12, claim 2, for "beam-like" read partition; and that the said Letters Patent should be read with this correction therein that the same may conform to the record of the case in the Patent Office.

Signed and sealed this 14th day of June, A. D. 1938.

(Seal)                                           Henry Van Arsdale,
                                          Acting Commissioner of Patents.